United States Patent
Sutskover et al.

(10) Patent No.: US 10,075,248 B2
(45) Date of Patent: Sep. 11, 2018

(54) PREAMBLE-BASED TRANSMISSION POWER DETECTION

(71) Applicant: Intel IP Corporation, Santa Clara, CA (US)

(72) Inventors: Ilan Sutskover, Hadera (IL); Lior Kravitz, Kfar Bilu (IL); Amit Freiman, Haifa (IL); Nir Tsur, Motskin (IL); Idan Yahav, Holon (IL)

(73) Assignee: Intel IP Corporation, Santa Clara, CA (US)

( * ) Notice: Subject to any disclaimer, the term of this patent is extended or adjusted under 35 U.S.C. 154(b) by 43 days.

(21) Appl. No.: 14/872,069

(22) Filed: Sep. 30, 2015

(65) Prior Publication Data

US 2017/0093504 A1    Mar. 30, 2017

(51) Int. Cl.
| | | |
|---|---|---|
| *H04B 17/10* | (2015.01) | |
| *H04B 17/373* | (2015.01) | |
| *H04W 52/22* | (2009.01) | |
| *H04W 52/52* | (2009.01) | |
| *H04L 29/06* | (2006.01) | |

(52) U.S. Cl.
CPC ......... *H04B 17/102* (2015.01); *H04B 17/373* (2015.01); *H04L 69/22* (2013.01); *H04W 52/223* (2013.01); *H04W 52/52* (2013.01)

(58) Field of Classification Search
CPC .................. H04W 52/52; H04L 25/03343
See application file for complete search history.

(56) References Cited

U.S. PATENT DOCUMENTS

| | | | | |
|---|---|---|---|---|
| 2003/0114127 | A1* | 6/2003 | Baldwin | H04W 52/267 455/245.1 |
| 2005/0032487 | A1* | 2/2005 | Montalvo | H03G 3/3047 455/126 |
| 2005/0130595 | A1* | 6/2005 | Shurvinton | H03G 3/3047 455/67.11 |
| 2005/0180360 | A1* | 8/2005 | Hansen | H04B 7/0667 370/334 |
| 2005/0201450 | A1* | 9/2005 | Volpi | G06K 7/0008 375/150 |
| 2006/0189276 | A1* | 8/2006 | Halinski | H04B 7/15535 455/66.1 |
| 2012/0175495 | A1* | 7/2012 | Marshall | G02B 27/0018 250/201.4 |

* cited by examiner

*Primary Examiner* — Christopher Crutchfield
(74) *Attorney, Agent, or Firm* — Schiff Hardin LLP (57) ABSTRACT

Described herein are technologies related to an implementation of transmission power detection in a communication device. The portion of a data signal, and in certain implementations the preamble, of the data signal is used in providing an integrated signal output to determine actual transmission power.

24 Claims, 5 Drawing Sheets

PREAMBLE-BASED TRANSMISSION POWER DETECTION

BACKGROUND

Wireless communication systems may use one or more channels to transfer data packet between a transmitter and a receiver. During transmission operations by the transmitter in a device, obtaining an accurate transmit power measurements is an important feature allowing for a regulatory conformance as well as predictable performance. For example, the transmit power measurements is utilized for power control flow such as a dynamic adjustment of a power level during transmission.

A typical approach when analyzing the transmission power of a Wi-Fi orthogonal frequency division multiplexing (OFDM) data packet, a radio frequency (RF) signal (at a power amplifier (PA) output) passes through an envelope detector (or a self-mixer) and subsequently is averaged to obtain the transmit power. With this approach, a signal from the envelope detector is typically digitalized and averaged. However, for signals with high peak-to-average power ratio (PAPR) like OFDM signals, the sampling rate of the digitizer needs to be substantially high in order to get low-variance statistics. Furthermore, data packet length needs to be long enough for low-variance statistics, which may sometimes render a change or impact to media access control (MAC) flows for adaptation of the packet length. The MAC flow impact is highly inconvenient and as such, measurements without changes to the MAC flows may provide efficient transmit power measurements.

DETAILED DESCRIPTION

Described herein is a technology for implementing a preamble-based transmission power detection in a transceiver circuitry of a communication device. For example, the transmission power detection is utilized to match actual transmission gain with a targeted transmission power during data transmission operations in the communication device.

As described herein, the transceiver circuitry, for example, transmits Wi-Fi OFDM data packets. In this example, a sampling circuit is used to sample a signal with minimal impact on the actual transmitted packet. For example, such a sampling circuit can be implemented using a directional coupler, voltage (resistive) sampling, inductive or capacitive coupling, or other such circuits. A directional coupler may be utilized to signal sample transmit power of the transmitted data packets. A detector circuit, which can be implemented using a self-multiplier, a square-law envelope detector, a log-amplifying rectifier or other means, which is coupled to the directional coupler, receives the sampled transmit power and generates a voltage square output (or voltage output) that is proportional to the sampled transmit power The voltage output is subsequently integrated within a defined (or accurate) period of time. That is, the integration for example, is kept to an integer number of periods within a preamble of the Wi-Fi OFDM data packets. Since the preamble is known as defined by the wireless communication protocol, better measurement accuracy is possible by reducing the uncertainty, thus lowering the amount and complexity of any additional processing. Although the preamble of a data signal is discussed, it is understood that other portions (e.g. mid-amble) of a data signal may be used in place of a preamble. The term "integer number of periods" as described herein is stated with respect to a reasonable accuracy. For example, the Wi-Fi OFDM preamble has ten (10) periods of 800 ns durations. In this example, the integration over the integer number of periods such as four (4) periods (i.e., 3200 ns) may achieve an accuracy up to 16 ns (~0.5%). In this example, the integration may be performed over the 4 periods of the preamble and need not cover the entire Wi-Fi OFDM data packet.

In an implementation, the Wi-Fi OFDM data packet and other wireless technology that utilize periodicity in their data packet transmission may use the implementations as described herein. In other implementations, such in a case of Complementary Code Keying (CCK) modulation scheme where the periodicity is not utilized during CCK transmissions, the implementations described herein (i.e., self-multiplier circuitry, filtering, integrating, and analog to digital conversion) may be similarly applied. For example, the CCK transmission has a preamble with a length that is long enough to facilitate averaging results of few very slow measurements. In this example, the substantially slow measurements (e.g., 1 MHz sampling rate) provide a good accuracy of measuring actual transmission gain.

With the integrated voltage output as described above, a sample-and-hold (S/H) circuitry is configured to sample analog integrated voltage output and holds the sampled analog integrated voltage output. An output of the S/H circuitry is subsequently received by the ADC for conversion into the digital integrated voltage output. A processor may then utilize the measured digital integrated voltage output to match the targeted transmission power with the actual transmission gain of the transceiver circuitry.

Figure 1:
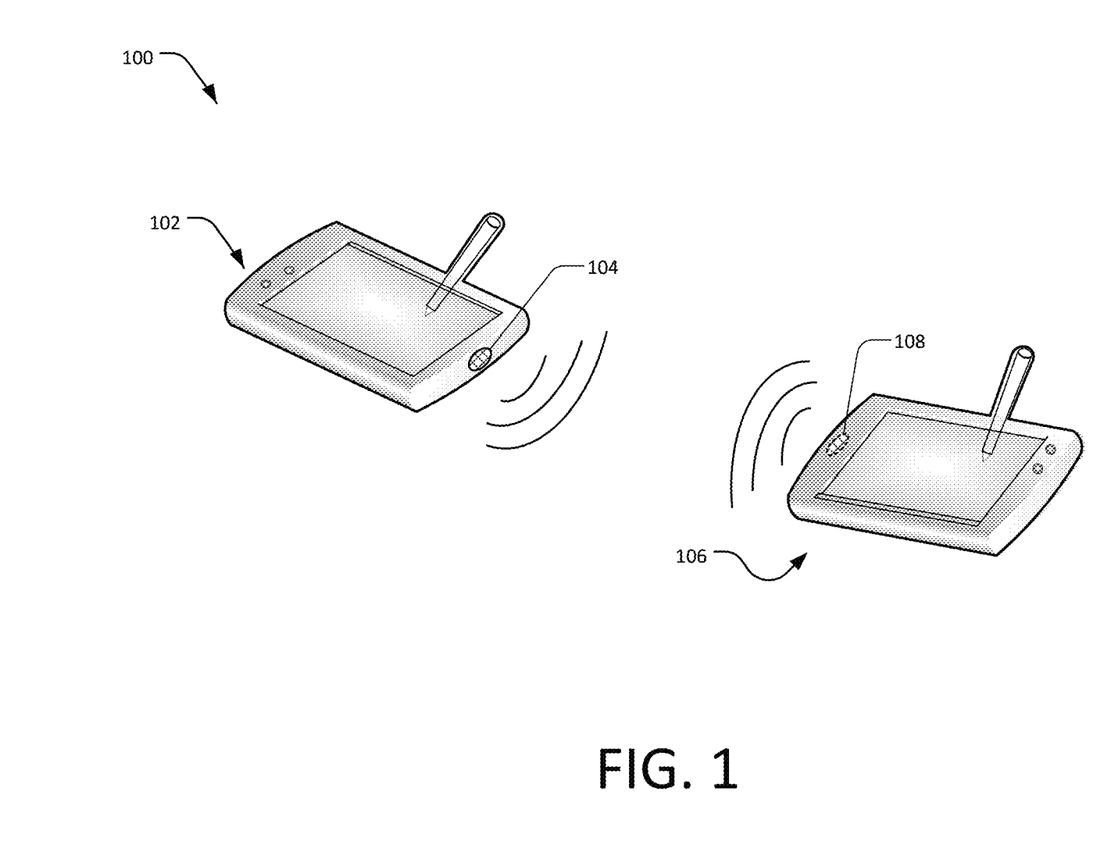
FIG. 1 illustrates an example scenario that implements a preamble-based transmission power detection in a communication device.

FIG. 1 is an example scenario 100 that utilizes a preamble-based transmission power detection in a transceiver circuitry or system of a communication device. The scenario 100 shows a communication device 102 with an antenna 104, and another communication device 106 with an antenna 108. In typical communications, a base station or access point (communication device 106 may be a base station or access point) acts an intermediary between communication device 102 and communication device 106.

The communication devices 102 or 106 may include, but are not limited to, a tablet computer, a netbook, a notebook computer, a laptop computer, mobile phone, a cellular phone, a smartphone, a personal digital assistant, a multimedia playback device, a digital music player, a digital video player, a navigational device, a digital camera, and the like. In certain implementations, devices 102 or 106 may perform non-wireless communication with non-wireless devices, such as an access point (AP) or base station. As an access point or base station, devices 102 or 106 may be wireless and wired connected. For example, in wired communications devices 102 or 106 may be connected by an Ethernet.

The communication device 102, for example, may communicate with the other communication device 106 in a network environment. The network environment, for example, includes a cellular network configured to facilitate communications between the communication device 102 and the other communication device 106. In another example, the communication device 102 communicates with an access point (AP) (not shown) using Wi-Fi OFDM data packets that have inherent periodicity in their data packet preambles. In both of these examples, and including other communications that have inherent periodicity in their respective data packet preambles, the transmission power detection as described herein may apply.

For example, during data packet transmissions, a signal sampling of a transmit power of the transmitted data packet is initiated. In this example, the transmission power detection includes generating of a signal or voltage output (or voltage square output) that is proportional to the sampled transmit power, and integrating the voltage output over a defined period of time (i.e., accurate period of time). The integrated voltage output is subsequently converted to digital integrated voltage output and stored in a memory of the communication devices 102 or 106.

With the detected or measured transmission power at the communication devices 102 or 106, the transmission gain during data transmission operations may be adjusted accordingly. That is, the transmission gain is adjusted to match the actual transmission gain with a targeted transmission power. In other scenarios, the measured transmission power is utilized for calibrations, power control, and the like, by external or internal circuitries.

Figure 2:
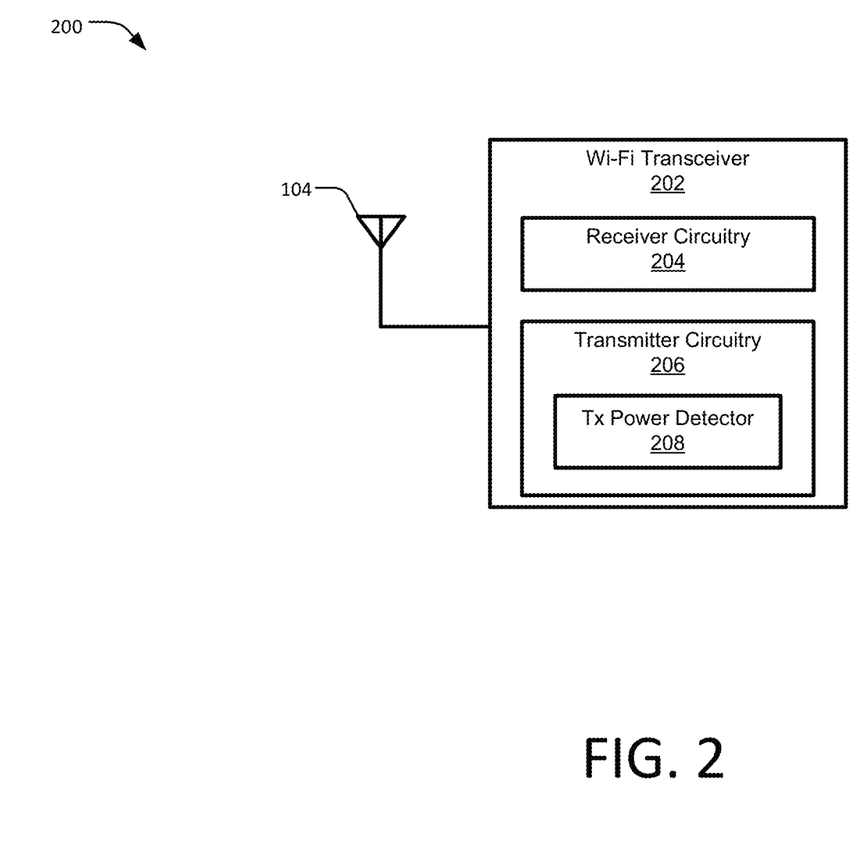
FIG. 2 illustrates an example implementation of a preamble-based transmission power detector in the communication device.

The example arrangement 100 illustrates in a limited manner basic components of wireless communications between the communication devices 102 and 106, other components such as battery, one or more processors, SIM card, etc. were not described in order to simplify the embodiments described herein FIG. 2 illustrates an example apparatus 200 that is configured to implement the preamble-based transmission power detection in the communication device 102. As shown, the apparatus 200 illustrates a Wi-Fi transceiver 202, which further includes a receiver circuitry 204 and a transmitter circuitry 206. The transmitter circuitry 206 may further include a preamble-based transmission power detector 208 that measures, for example, the actual transmission power at the communication device 102 during data packet transmission operations. The measured actual transmission power may be utilized, but not limited to, power control purposes, calibration, and the like. The apparatus 200 illustrates in a limited manner basic components of the communication device 102. Other components such as battery, one or more memories, SIM card, etc. were not described in order to simplify the embodiments described herein.

During Wi-Fi transmission operations, the transmitter circuitry 206 may transmit quadrature modulated RF signals such as Wi-Fi OFDM data packets. The Wi-Fi OFDM data packets, for example, may include a fixed number of preambles. In this example, the preamble of the Wi-Fi OFDM data packets includes inherent periodicity as well.

The transmitter circuitry 206 amplifies the Wi-Fi OFDM data packets prior to transmission by the antenna 104. The Wi-Fi OFDM data packets may include a combination of in-phase (I) and quadrature-phase (Q) modulated data packets, and may be preceded by preambles during the transmission of the OFDM modulated RF signals. The preamble, for example, may be utilized by the transmission power detector 208 to determine the actual amount of transmission power with substantial accuracy and without the need of sampling or measuring the entire data packets. In addition, power of the preamble in systems is essentially proportional to the transmit power of the rest of the packet. Therefore, estimating the packet's power based on preamble may be performed in the determination of transmit power. In this example, the preamble may include preamble periods for Legacy-Short Training Field (L-STF) or Legacy-Long Training Field (L-LTF).

As described herein, the transmission power detector 208 may include one or more processors, hardware, firmware, or a combination thereof in implementing the preamble-based transmission power detection. For example, the transmission power detection is generally based upon the firmware reading stored voltage values for the integer number of analog integration periods. In this example, the integer number of analog integration periods are within the preamble of the Wi-Fi OFDM data packets. In other words, the integration period is implemented within a particular defined integration period. In this manner, the inherent periodicity of the preamble provides invariance to the starting point of the particularly defined integration period.

The inherent periodicity as mentioned in the foregoing may be required for two reasons. First, from a practical point of view, synchronization of the transmission detection at chip output with the exact samples of the preamble may be difficult to implement. As opposed to present implementations herein, the inherent periodicity renders the integration over an integer number of periods to be insensitive to starting point of the integration.

The second reason is determinism. That is, unlike the data packet that is pseudo-randomly scrambled and in general based also on different input bytes, the preamble of the OFDM data packet is the same for all packets. Thus, as described herein, relative measurements compared to a benchmark are of importance and the transmission power detector 208 is substantially accurate with respect to relative transmission power. A question of absolute accuracy is left outside the scope of this disclosure and it will suffice to state that an absolute accuracy may be achieved with the help of various calibrations to a satisfactory level.

Furthermore, an advantage of the apparatus 200 is that the transmission power measurement may be done for on Wi-Fi OFDM data packets since the data packets share the same preamble at the start of the frame. Furthermore still, the firmware may be substantially improved since the code does not need to consider cases of transmit power calibration packets in conjunction with other features (e.g., with or without encryption). That is, there is no need to force data packet length through low modulation and coding scheme.

With continuing reference to FIG. 2, the transmission power detector 208 may be implemented in other modulation schemes such as the CCK modulation scheme where the periodicity is not utilized during CCK transmissions. For example, the CCK transmission includes a preamble with a length that is long enough to facilitate averaging results of few very slow measurements. In this example, the substantially slow measurements (e.g., 1 MHz sampling rate) provide accuracy of measuring actual transmission gain.

Figure 3:
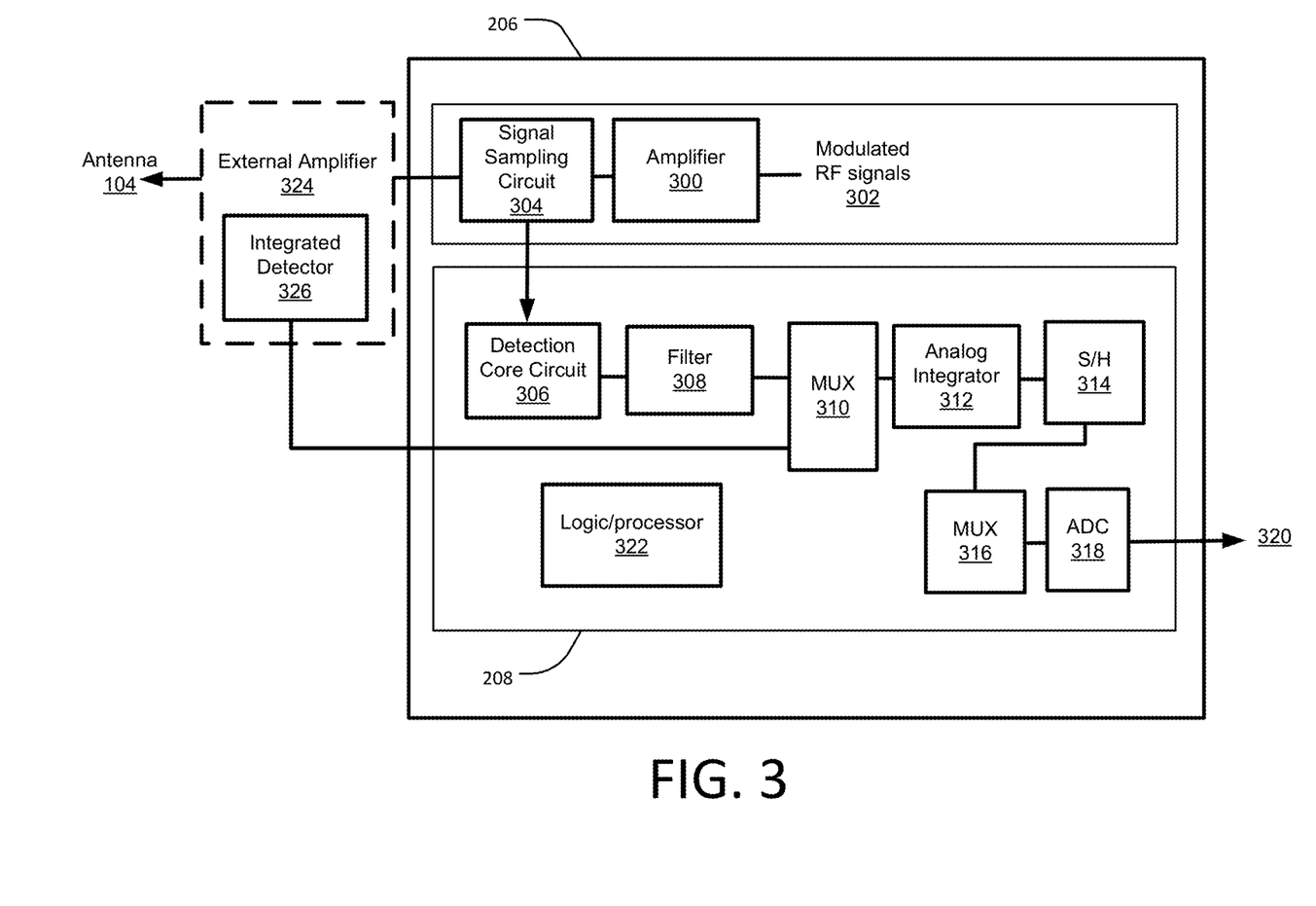
FIG. 3 illustrates an example block diagram showing components of a transmission power detection circuitry as described herein in accordance with implementations herein.

FIG. 3 is a block diagram of the transmitter circuitry 206 that shows an example implementation of the transmission power detector 208 as described herein. The transmission circuitry 206 may be implemented in various devices, components, and the like, such as, but not limited to a module (e.g., board and chip) with an external interface (e.g., PCIe or SDIO); a similar module soldered on a platform board; another similar module with an external power amplifier (PA) and external power detector, a chip assembled on platform with an internal or external power detector and power amplifier, or a system in a package (SIP) (i.e., packaged chip, including inside package also front-end components), or a bare die. It is to be understood that in certain implementations, an external amplifier is used with a multiplexor. In other implementations, an internal amplifier is used without the use of a multiplexor.

For example, the transmitter circuitry 206 includes the transmission power detector 208 that may be tapped or coupled to an output of an internal amplifier 300. In an implementation, the transmission power detector 208 may be disposed within the transmitter circuitry 206, or in other implementations, as an external component to the Wi-Fi transceiver 202. The internal amplifier 300 may receive modulated RF signals 302 for transmission through a signal sampling circuit 304 to the antenna 104. Signal sampling may include for example, directional coupling, resistive sampling, capacitive sampling, magnetic coupling, etc. The modulated RF signals 302, for example, includes OFDM modulated data packets with inherent periodicity in their preambles. Furthermore still, FIG. 3 illustrates the transmission power detector 208 to include a detection core circuit 306, a filter 308, a multiplexer (MUX) 310 (used when an external amplifier is implemented), an analog integrator 312, a sample and hold (S/H) 314, another multiplexer (MUX) 316, and an analog to digital converter (ADC) 318 to generate an output 320. In certain implementations the detection core circuit 306 includes a self multiplying mixer, square-law envelop detector and log amplifying rectifier. A processor 320 may be provided for control of certain components, such as the detection core circuit 306.

In an implementation, the signal and sampling circuit 304 may sample a forward power and a reflected power along a transmission line (not shown) that connects, for example, the amplifier 300 and the antenna 104. A directional coupler in signal and sampling circuit 304 can provide two outputs, one output for forward power and another for reverse power. The detection core circuit 306 receives the two outputs. The 314 takes the two output values for the forward and the reverse and sequentially samples them. Logic/processor 322 activates and times each path of the output values.

In another implementation, the detection core circuit 306 is coupled to an input side of the amplifier 300 and as such, the signal sampling circuit 304 may sample the forward and reflected powers at the input side of the amplifier 300 without affecting the implementations described herein. The sampled forward and reflected powers (or sampled power), in this example, are fed to the detection core circuit 306 for further processing.

The detection core circuit 306 receives the sampled power and generates a voltage square output (or voltage output) that is proportional to the transmitted power as seen at the output side of the amplifier 300. In the case where the signal sampling circuit 304 measure power at the input side of the amplifier 300, the generated voltage output will be proportional to the sampled power as seen at the input side of the amplifier 300.

With the generated voltage output, the filter 308 is configured to cancel high frequency components of the generated voltage output. For example, the filter 308 is a low-pass filter that eliminates double frequency components of the sampled voltage output and allows essentially low frequency components of the generated voltage output. In this example, the filtered voltage output may be treated as more of a baseband signal.

As described in present implementations herein, the analog integrator 312 is configured to perform integration of the filtered voltage output to an integer number of periods within the preamble. That is, the duration of integration by the analog integrator 312 is within a particularly defined (or accurate) integration period so that the starting point of the integration does not matter in the measurement of the actual transmission power. For example, the Wi-Fi OFDM preamble has ten (10) periods of 800 ns durations or a total of 8000 ns for the L-STF. In this example, the integration over the integer number of periods such as four (4) periods (i.e., 3200 ns) may generate integrator voltage output that is proportional to input filtered voltage output (i.e., output of filter 308) integrated over time (i.e., four periods or 3200 nsec). The input filtered voltage output may include low-frequency components of the generated voltage output of the self-multiplier circuitry 306. In the example above, the transmission power measurements based upon the specific periods of the preamble of a particular data packet may increase efficiency of the transmission power measurements in subsequent data packets.

In another example, where the L-LTF preamble periods are used, the L-LTF has two full repetitions (2.5 repetitions within 8 μs) repetitions of 3.2 usec (3200 nsecs) and the integration period may be performed over a specific integration period such as 3200 nsec integration period to obtain the integrator voltage output. In this example, the integration by the analog integrator 312 is implemented within a defined period of time and may similarly be repeated in each data packet to increase efficiency of transmission gain measurements in subsequent data packets.

With the obtained integrator voltage output from the analog integrator 312, the S/H 314 may sample the voltage output of the analog integrator 312 at the end of the integration period, and maintain voltage output at a constant level to be measured by the ADC 318 through the MUX 316. For example, the S/H 314 utilizes a capacitor to capture a voltage of continuously varying analog integrator voltage output and holds the captured voltage for a specified time depending upon a hold period of the S/H 314 until read by the ADC 318. While integrating, the value increases. Then, if not sampled immediately, the output starts losing charge and value decreases gradually. The S/H 314 works to avoid as much as possible the decrease, but one that is significantly slower than the integration itself. In this example, the ADC 316 may use the captured analog integrator voltage output of the particular S/H sample for conversion to digital integrator voltage output.

In an implementation, the ADC 318 may be utilized for multiple detectors other than the transmitter power detector 208. That is, the MUX 310 may receive an output of another S/H (not shown) from another detector (not shown) that may be disposed at 5.2 GHz band—backward port, 5.2 GHz band—forward port, 2.4 GHz band forward port, and/or 2.4 GHz band—backward port. The ADC 318 may be used to measure the outputs of external power detectors.

It is to be understood that two particular implementations include the use of the mux 310 to get data from external integrated detector 326 and provide the input to the analog integrator 312. In another implementation, the mux 316 is used to get data from the external integrated detector 326 without analog integration.

From the ADC 318, the captured integrator voltage output for the particular S/H sample is stored in a memory register for further processing. In appropriate, the logic/processor 310, which is configured to centrally control operations, may be further configured to average the results that were stored in the memory register. Based from the averaged value, the output 318 may be utilized for power control, calibration purposes (e.g., matching actual transmission gain with targeted transmission power), or a reference for another circuitry (not shown) that may utilize the measured actual transmission gain. In another implementation, the firmware reads the stored results in the memory register and may perform averaging of the stored results.

In certain implementations, the amplifier 300 may be external to transmitter circuitry 206. Such implementations, include a separate die integration of the amplifier 300 to the transceiver (transmitter circuitry 206), wherein the amplifier may be supplied as a separate component. An external power amplifier (PA) 324 includes an integrated power detector 326. The integrated detector 326 outputs a voltage signal proportional to the momentary output power of the external PA 324. Such an output voltage can be applied to an input of the transceiver silicon die or transmitter circuitry, and connected via MUX 310 to the analog integrator 312. Such an implementation, allows for the same operation as using the signal sampling circuit 304, detection core circuit 306 and filter 308 integrated in the transceiver (i.e., transmission power detector 208).

Figure 4:
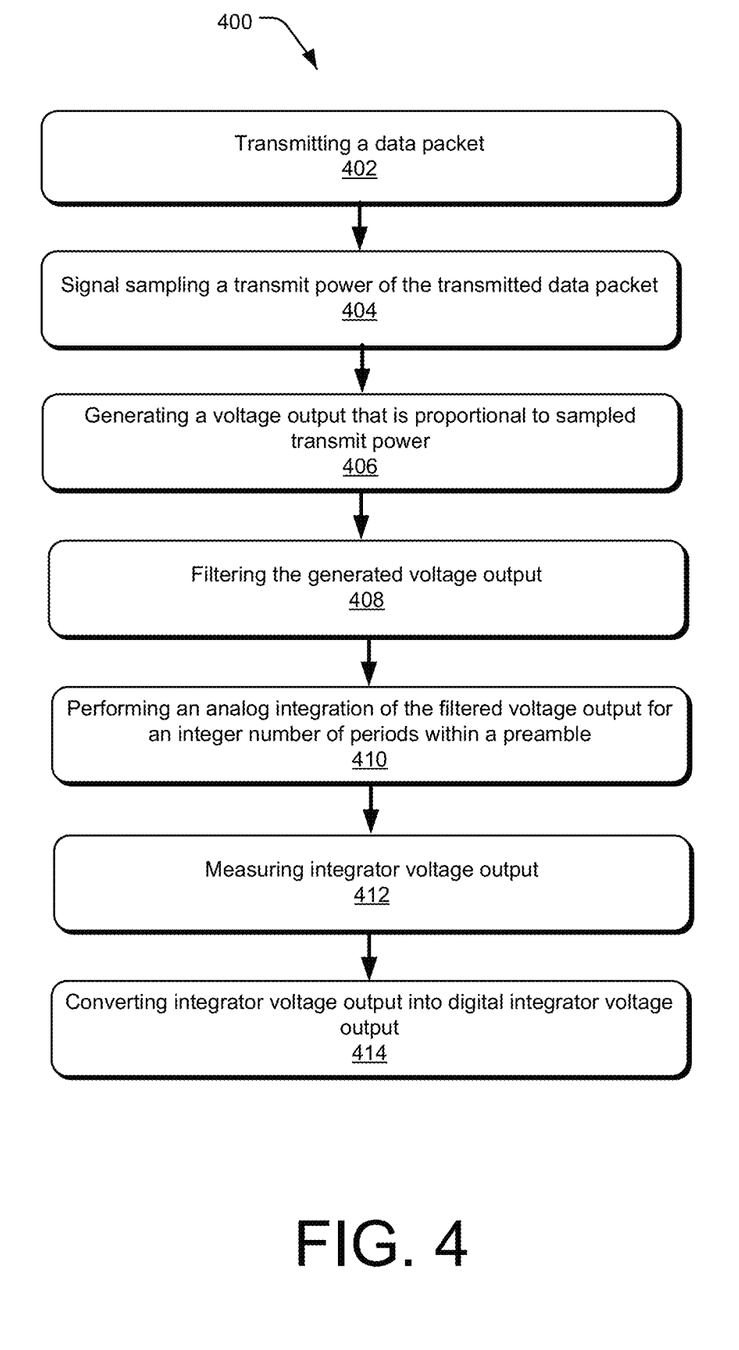
FIG. 4 illustrates an exemplary process for implementing preamble-based transmission power detection in accordance with implementations described herein.

FIG. 4 shows an example process flowchart 400 illustrating an example method for implementing a preamble-based transmission power detector in a communication device. The measured actual transmission power for example, may be utilized to adjust transmission gain, to measure transmit power of a data packet for purposes of adjusting next data packet's transmit power, and the like. The order in which the method is described is not intended to be construed as a limitation, and any number of the described method blocks may be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At block 402, transmitting a data packet is performed. For example, the transmitter circuitry 206 is transmitting Wi-Fi OFDM data packets through the antenna 104. In this example, the Wi-Fi OFDM data packets may be processed through the amplifier 300 prior to transmission by the antenna 104.

At block 404, sampling a transmission power of the transmitted data packet is performed. For example, a sampling circuit (e.g., the signal sampling circuit 304) may sample the forward and reflected powers at the output side or input side of an amplifier (e.g. amplifier 300 or amplifier 324). In certain implementations, only forward power is sample. The amplifier, for example, may include a power amplifier or low-gain amplifiers. In the discussed example, the signal sampling circuit 304 may generate a signal sample (i.e., sampled transmission power) of the forward and reflected powers of the amplifier 300 or amplifier 324 depending upon where the signal sampling circuit 304 is coupled. Reverse is power reflected back from further down the chain (e.g., from the antenna). The reverse port measurement does not measure the power at the amplifier output, but the one reflected back into that the amplifier output. In high level, the power transmitted outside is the forward power minus the reverse power, where forward is what the amplifier tries to transmit. The reverse power is returned and thus emitted from the antenna is essentially their difference between forward and between reverse power.

At block 406, generating a voltage output that is proportional to sampled transmission power is performed. For example, the self-multiplier circuitry 306 is configured to generate a voltage square output that is proportional to the transmitted power at the output or the input of the amplifier 300 depending upon where the signal sampling circuit 304 is tapped.

At block 408, filtering the generated voltage output is performed. For example, the filter 308 is configured to cancel high frequency components of the sampled voltage output. In this example, low frequency components of the sampled voltage output passes through the filter 308.

At block 410, performing an integration of the filtered voltage output is performed. For example, the logic/processor 310 controls the analog integrator 310 so that analog integration of the filtered (generated) voltage output is kept to an integer number of periods within the preamble. That is, the integration by the analog integrator 310 is implemented to a particularly defined integration period. As described herein, the analog integrator 310 provides an integrator voltage output for a specified integration time period e.g., four periods of the L-STF or for example one period of the L-LTF.

At block 412, measuring integrator voltage output is performed. For example, the S/H 312 samples the integrator voltage output and holds the sampled integrator voltage output for a specified time duration. In this example, the sampling of the integrator voltage output is dictated by the hold period of the S/H 312, where sample the voltage output maintained at constant level is measured by the ADC 316.

At block 414, converting the integrator voltage output into digital voltage output is performed. For example, the ADC 308 is configured to transform the sampled integrator voltage output into digital form. In this example, the digital integrator voltage output for the particular sampling at the S/H 312 is stored at the memory register.

With the stored digital integrator voltage output corresponding to multiple samplings by the S/H 312, the firmware may average the stored digital integrator voltage output to generate the actual transmission gain of the transmitter circuitry 206.

Figure 5:
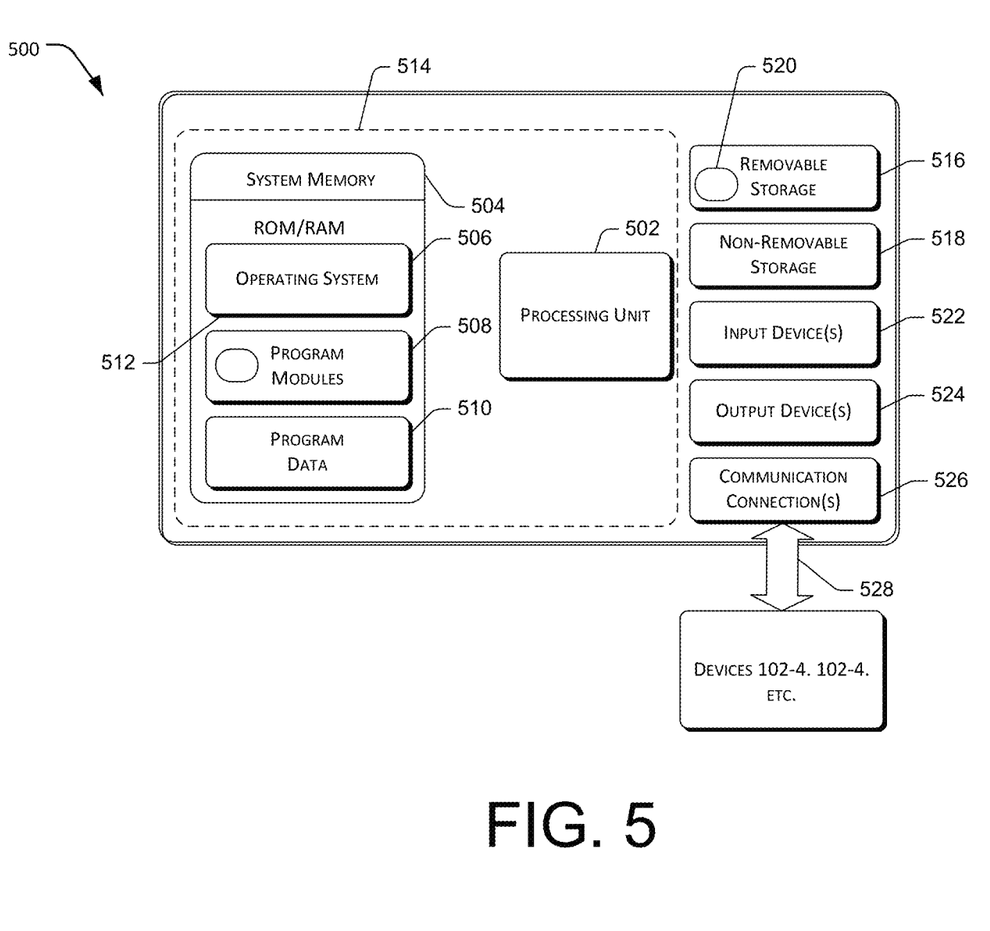
FIG. 5 is an example system that may be utilized to implement preamble-based transmission power detector in the communication device.

FIG. 5 is an example system that may be utilized to implement various described embodiments. However, it will be readily appreciated that the techniques disclosed herein may be implemented in other computing devices, systems, and environments. The computing device 500 shown in FIG. 5 is one example of a computing device and is not intended to suggest any limitation as to the scope of use or functionality of the computer and network architectures.

In at least one implementation, computing device 500 typically includes at least one processing unit 502 and system memory 504. Depending on the exact configuration and type of computing device, system memory 504 may be volatile (such as RAM), non-volatile (such as ROM, flash memory, etc.) or some combination thereof. System memory 504 may include an operating system 506, one or more program modules 508, and may include program data 510. A basic implementation of the computing device 500 is demarcated by a dashed line 514.

The program module 508 may include a module 512. For example, the module 512 may carry out one or more of the method 400, and variations thereof, e.g., the computing device 500 acting as described above with respect to the device 102.

Computing device 500 may have additional features or functionality. For example, computing device 500 may also include additional data storage devices such as removable storage 516 and non-removable storage 518. In certain implementations, the removable storage 516 and non-removable storage 518 are an example of computer accessible media for storing instructions that are executable by the processing unit 502 to perform the various functions described above. Generally, any of the functions described with reference to the figures may be implemented using software, hardware (e.g., fixed logic circuitry) or a combination of these implementations. Program code may be stored in one or more computer accessible media or other computer-readable storage devices. Thus, the processes and components described herein may be implemented by a computer program product. As mentioned above, computer accessible media includes volatile and non-volatile, removable and non-removable media implemented in any method or technology for storage of information, such as computer readable instructions, data structures, program modules, or other data. The terms "computer accessible medium" and "computer accessible media" refer to non-transitory storage devices and include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium that may be used to store information for access by a computing device, e.g., computing device 500 and wireless mobile device 102. Any of such computer accessible media may be part of the computing device 500.

In one implementation, the removable storage 516, which is a computer accessible medium, has a set of instructions 520 stored thereon. When executed by the processing unit 502, the set of instructions 520 cause the processing unit 502 to execute operations, tasks, functions and/or methods as described above, including method 500 and any variations thereof.

Computing device 500 may also include one or more input devices 522 such as keyboard, mouse, pen, voice input device, touch input device, etc. Computing device 500 may additionally include one or more output devices 522 such as a display, speakers, printer, etc.

Computing device 500 may also include one or more communication connections 526 that allow the computing device 500 to communicate wirelessly with one or more other wireless devices, over wireless connection 528 based on near field communication (NFC), Wi-Fi, Bluetooth, radio frequency (RF), infrared, or a combination thereof.

It is appreciated that the illustrated computing device 500 is one example of a suitable device and is not intended to suggest any limitation as to the scope of use or functionality of the various embodiments described.

Unless the context indicates otherwise, the term "Universal Resource Identifier" as used herein includes any identifier, including a GUID, serial number, or the like.

In the above description of example implementations, for purposes of explanation, specific numbers, materials configurations, and other details are set forth in order to better explain the present invention, as claimed. However, it will be apparent to one skilled in the art that the claimed invention may be practiced using different details than the example ones described herein. In other instances, well-known features are omitted or simplified to clarify the description of the example implementations.

The inventors intend the described example implementations to be primarily examples. The inventors do not intend these example implementations to limit the scope of the appended claims. Rather, the inventors have contemplated that the claimed invention might also be embodied and implemented in other ways, in conjunction with other present or future technologies.

Moreover, the word "example" is used herein to mean serving as an example, instance, or illustration. Any aspect or design described herein as "example" is not necessarily to be construed as preferred or advantageous over other aspects or designs. Rather, use of the word example is intended to present concepts and techniques in a concrete fashion. The term "techniques", for instance, may refer to one or more devices, apparatuses, systems, methods, articles of manufacture, and/or computer-readable instructions as indicated by the context described herein.

As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more", unless specified otherwise or clear from context to be directed to a singular form.

These processes are illustrated as a collection of blocks in a logical flow graph, which represents a sequence of operations that may be implemented in mechanics alone or a combination with hardware, software, and/or firmware. In the context of software/firmware, the blocks represent instructions stored on one or more computer-readable storage media that, when executed by one or more processors, perform the recited operations.

Note that the order in which the processes are described is not intended to be construed as a limitation, and any number of the described process blocks may be combined in any order to implement the processes or an alternate process. Additionally, individual blocks may be deleted from the processes without departing from the spirit and scope of the subject matter described herein.

The term "computer-readable media" includes computer-storage media. In one embodiment, computer-readable media is non-transitory. For example, computer-storage media may include, but are not limited to, magnetic storage devices (e.g., hard disk, floppy disk, and magnetic strips), optical disks (e.g., compact disk (CD) and digital versatile disk (DVD)), smart cards, flash memory devices (e.g., thumb drive, stick, key drive, and SD cards), and volatile and non-volatile memory (e.g., random access memory (RAM), read-only memory (ROM)).

Unless the context indicates otherwise, the term "logic" used herein includes hardware, software, firmware, circuitry, logic circuitry, integrated circuitry, other electronic components and/or a combination thereof that is suitable to perform the functions described for that logic.

The following examples pertain to further embodiments:

Example 1, is a method of preamble-based transmission power detection comprising: transmitting a data packet; generating a signal output that is proportional to the transmit power of the transmitted data packet; performing an integration of the generated signal output, wherein the integration is kept to an integer number of periods within a portion of the generated signal output to provide an integrated signal output; and determining actual transmission power based upon the integrated signal output.

In Example 2, the method as recited in example 1, wherein the generated signal output is proportional to the sampled transmit power.

In Example 3, the method as recited in example 1, wherein the integer number of periods is related to length or number of periods in the portion of the signal.

In Example 4, the method as recited in example 1, wherein the integration uses a subset of the repetitions in the portion of the signal.

In Example 5, the method as recited in example 1, further comprising: filtering of the generated signal output, wherein the filtering comprises low-pass frequency filtering.

In Example 6, the method as recited in example 1 further comprising: filtering of the generated signal output, wherein the filtering comprises band-pass frequency filtering.

In Example 7, the method as recited in example 1 further comprising: converting the integrated signal output from analog integrated signal output to digital integrated signal output, wherein the digital integrated signal output is stored in a memory register.

In Example 8, the method as recited in example 7, wherein the integrated signal conversion further comprises: sampling of the analog integrated signal output and holding the sampled analog integrated signal output for a specified period of time based on a hold time of the S/H circuitry, wherein the sampled and held integrated signal output is converted to the digital integrated voltage output and stored at the memory register.

In Example 9, the method as recited in example 7, wherein the stored digital integrated signal output is used as a reference for gain adjustment of the transmitted data packet and succeeding data packets.

In Example 10, the method as recited in example 1, wherein the integer number of periods comprises Legacy-LTF (L-LTF) periods of the portion of the signal.

In Example 11, the method as recited in example 1, wherein the signal is a wireless-fidelity (Wi-Fi) Orthogonal Frequency Division Multiplexing (OFDM) signal.

In Example 12, the method as recited in any of examples 1 to 10, wherein the portion of the signal is a preamble.

In Example 13, the method as recited in any of examples 1 to 10, wherein the signal output is a voltage output.

Example 14 is a transmission power detector comprising: a signal sampling circuit configured to sample a transmit power of a transmitted data packet; a detection core circuit configured to generate a signal output that is proportional to the transmit power of the transmitted data packet; an analog integrator configured to perform an integration of the generated signal output, wherein the integration is kept to an integer number of periods within a portion of the signal output; and an analog to digital converter (ADC) configured to convert the integrated signal output into digital integrated voltage output, wherein an actual transmission gain is based upon the integrated voltage output.

In Example 15, the transmission power detector as recited in example 14, wherein the detection core circuit is a self-multiplier and/or square-law envelope detector.

In Example 16, the transmission power detector as recited in example 14 further comprising a sample-and-hold (S/H) circuitry that samples analog integrated voltage output and holds the sampled analog integrated voltage output for a specified period of time based on hold time of the S/H circuitry, wherein the sampled and held integrated voltage output is received by the ADC for conversion into the digital integrated voltage output.

In Example 17, the transmission power detector as recited in example 16, wherein the ADC facilitates storing of the digital integrated voltage output to a memory register.

In Example 18, the transmission power detector as recited any of examples 14 to 17, further comprising: a filter configured to channel low frequency components of the generated signal output to the analog integrator.

In Example 19, the transmission power detector as recited any of examples 14 to 17, further comprising a filter configured to pass band pass frequency components of the generated voltage output to the analog integrator.

In Example 20, the transmission power detector as recited in example 14, further comprising a logic or processor configured to control operations of a sample-and-hold (S/H) circuitry, the signal sampling circuit, detection core circuit, filter, analog integrator, and the ADC.

Example 21 is a device comprising: one or more processors; a transmission power detector coupled to the one or more processors, the transmission power detector further comprises: a signal sampling circuit configured to sample a transmit power of a transmitted data packet; a detection core circuit configured to generate a voltage output that is proportional to the transmit power of the transmitted data packet; a filter configured to pass low or band pass frequency components of the generated voltage output; an analog integrator configured to perform an integration of the filtered voltage output, wherein the integration is kept to an integer number of periods within a portion of a signal; and an analog to digital converter (ADC) configured to convert the integrated voltage output into digital integrated voltage output, wherein an actual transmission gain is based upon the integrated voltage output.

In Example 22, the device as recited in example 21, wherein the integer number of periods within the portion of the signal is controlled by software or firmware controlled by the processors.

In Example 23, the device as recited in example 21, further comprising a sample-and-hold (S/H) circuitry that samples analog integrated voltage output and holds the sampled analog integrated voltage output for a specified period of time based on a hold time of the S/H circuitry, wherein the sampled and held integrated voltage output is received by the ADC for conversion into the digital integrated voltage output.

In Example 24, the device as recited in example 23, comprising a logic/processor configured to control operations of the signal sampling circuit, detection core circuit, filter, analog integrator, S/H circuitry, and the ADC.

In Example 25, the device as recited in any of examples 21 to 24, wherein the integer number of periods comprises integration of the generated voltage output by the analog integrator for an accurate integration period.

What is claimed is:

1. A method of preamble-based transmission power detection comprising:
    transmitting a signal including a data packet;
    generating a signal output that is proportional to the transmit power of the transmitted data packet;
    performing an integration of the generated signal output over a period of time to provide an integrated signal output,
    wherein the period of time is kept to an integer number of periods within a portion of the signal, the integer number of periods being a subset of periods within the portion of the signal; and
    determining actual transmission power based upon the integrated signal output, wherein the integer number of periods is adjusted based on a training field type of the portion of the signal.

2. The method as recited in claim 1, wherein the portion of the signal is a preamble.

3. The method as recited in claim 1, wherein the generated signal output is a voltage output.

4. The method as recited in claim 1, wherein the generated signal output is proportional to a sampled transmit power of the transmitted data packet.

5. The method as recited in claim 1, wherein the integer number of periods is related to a length or to a number of periods in the portion of the signal.

6. The method as recited in claim 1, wherein the integration uses a subset of repetitions in the portion of the signal.

7. The method as recited in claim 1, further comprising:
filtering the generated signal output, wherein the filtering comprises low-pass frequency filtering.

8. The method as recited in claim 1, further comprising:
filtering the generated signal output, wherein the filtering comprises band-pass frequency filtering.

9. The method as recited in claim 1, further comprising:
converting the integrated signal output from an analog integrated signal output to a digital integrated signal output; and
storing the digital integrated signal output in a memory register.

10. The method as recited in claim 9, wherein the act of converting the integrated signal output further comprises:
sampling, via sample-and-hold (S/H) circuitry, the analog integrated signal output; and
holding, via the S/H circuitry, the sampled analog integrated signal output for a specified period of time based on a hold time of the S/H circuitry,
wherein the sampled and held analog integrated signal output is converted to the digital integrated signal output and stored in the memory register.

11. The method as recited in claim 9, wherein the stored digital integrated signal output is used as a reference for gain adjustment associated with the transmitted data packet and successive data packets.

12. The method as recited in claim 1, wherein the integer number of periods comprises Legacy-Long Training Field (L-LTF) periods of the portion of the signal.

13. The method as recited in claim 1, wherein the signal is a wireless-fidelity (Wi-Fi) Orthogonal Frequency Division Multiplexing (OFDM) signal.

14. A transmission power detector, comprising:
a signal sampling circuit configured to sample a transmit power of a transmitted data packet included in a transmitted signal;
a detection core circuit configured to generate a signal output that is proportional to the transmit power of the transmitted data packet;
an analog integrator configured to perform an integration of the generated signal output over a period of time to provide an integrated signal output,
wherein the period of time is kept to an integer number of periods within a portion of the transmitted signal, the integer number of periods being a subset of periods within the portion of the transmitted signal; and
an analog to digital converter (ADC) configured to convert the integrated generated signal output into a digital integrated voltage output,
wherein an actual transmission gain is based upon the digital integrated voltage output, and wherein the integer number of periods is adjusted based on a training field type of the portion of the transmitted signal.

15. The transmission power detector as recited in claim 14, wherein the detection core circuit includes at least one of a self-multiplier or a square-law envelope detector.

16. The transmission power detector as recited in claim 14, further comprising:
a sample-and-hold (S/H) circuitry that samples an analog integrated voltage output associated with the integrated signal output and holds the sampled analog integrated voltage output for a specified period of time based on hold time of the S/H circuitry,
wherein the sampled and held analog integrated voltage output is received by the ADC for conversion into the digital integrated voltage output.

17. The transmission power detector as recited in claim 16, wherein the ADC facilitates storing of the digital integrated voltage output to a memory register.

18. The transmission power detector as recited in claim 14, further comprising:
a filter configured to pass low frequency components of the generated signal output to the analog integrator.

19. The transmission power detector as recited in claim 14, further comprising:
a filter configured to pass band pass frequency components of the generated signal output to the analog integrator.

20. The transmission power detector as recited in claim 14, further comprising:
a processor configured to control operations of the signal sampling circuit, the detection core circuit, the analog integrator, and the ADC.

21. A device comprising:
one or more processors; and
a transmission power detector coupled to the one or more processors, the transmission power detector comprising:
a signal sampling circuit configured to sample a transmit power of a transmitted data packet included in a transmitted signal to provide a sampled signal;
a detection core circuit configured to generate, from the sampled signal, a voltage output that is proportional to the transmit power of the transmitted data packet;
a filter configured to pass low or band pass frequency components of the generated voltage output to provide a filtered voltage output;
an analog integrator configured to perform an integration of the filtered voltage output over a period of time to provide an integrated voltage output,
wherein the period of time is kept to an integer number of periods within a portion of the transmitted signal, the integer number of periods being a subset of periods within the portion of the transmitted signal; and
an analog to digital converter (ADC) configured to convert the integrated voltage output into a digital integrated voltage output,
wherein an actual transmission gain is based upon the digital integrated voltage output, and
wherein the integer number of periods is adjusted based on a training field type of the portion of the transmitted signal.

22. The device as recited in claim 21, wherein the integer number of periods within the portion of the transmitted signal is controlled by software or firmware controlled by the one or more processors.

23. The device as recited in claim 21, further comprising:
a sample-and-hold (S/H) circuitry that samples an analog integrated voltage output associated with the integrated voltage output and holds the sampled analog integrated voltage output for a specified period of time based on a hold time of the S/H circuitry,
wherein the sampled and held analog integrated voltage output is received by the ADC for conversion into the digital integrated voltage output.

24. The device as recited in claim 23, wherein the one or more processors are configured to control operations of the signal sampling circuit, the detection core circuit, the filter, the analog integrator, the S/H circuitry, and the ADC.

* * * * *